(12) United States Patent
Okagaki et al.

(10) Patent No.: US 8,439,506 B2
(45) Date of Patent: May 14, 2013

(54) REFLECTOR MOUNTING STRUCTURE AND PROJECTION DISPLAY DEVICE

(75) Inventors: Satoru Okagaki, Tokyo (JP); Norihiro Watanabe, Tokyo (JP); Atsushi Michimori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 317 days.

(21) Appl. No.: 12/822,227

(22) Filed: Jun. 24, 2010

(65) Prior Publication Data
US 2011/0116057 A1    May 19, 2011

(30) Foreign Application Priority Data
Nov. 13, 2009    (JP) .................... 2009-260040

(51) Int. Cl.
*G03B 21/14* (2006.01)
(52) U.S. Cl.
USPC ............... 353/101; 353/37; 353/50; 353/51; 353/73; 353/77; 353/78; 353/98; 353/99
(58) Field of Classification Search ............... 353/37, 353/50, 73, 77, 98, 101, 51, 78, 99; 359/849, 359/871, 872, 881
See application file for complete search history.

(56) References Cited

U.S. PATENT DOCUMENTS

| | | | | |
|---|---|---|---|---|
| 4,129,365 A | * | 12/1978 | Aversano et al. | 353/99 |
| 6,059,412 A | * | 5/2000 | Sugita | 353/37 |
| 6,293,682 B1 | * | 9/2001 | Kawaguchi | 359/871 |
| 6,623,123 B2 | * | 9/2003 | Eguchi et al. | 353/30 |
| 7,029,131 B2 | * | 4/2006 | Furuichi | 353/98 |
| 7,108,381 B2 | * | 9/2006 | Furuichi | 353/98 |
| 7,535,648 B2 | * | 5/2009 | Yoshikawa et al. | 359/648 |
| 7,686,458 B2 | * | 3/2010 | Aizawa et al. | 353/98 |
| 7,798,655 B2 | * | 9/2010 | Matsuura et al. | 353/99 |
| 2002/0067469 A1 | * | 6/2002 | Eguchi et al. | 353/31 |
| 2004/0169828 A1 | * | 9/2004 | Furuichi | 353/98 |
| 2007/0195441 A1 | * | 8/2007 | Aizawa et al. | 359/871 |
| 2008/0002158 A1 | * | 1/2008 | Matsuoka | 353/77 |
| 2008/0013055 A1 | * | 1/2008 | Matsuura et al. | 353/99 |

FOREIGN PATENT DOCUMENTS

| | | |
|---|---|---|
| JP | 3913265 B2 | 5/2007 |
| JP | 2008-139442 A | 6/2008 |
| WO | WO 2006/019018 A1 | 2/2006 |

* cited by examiner

*Primary Examiner* — Francis M Legasse, Jr.
*Assistant Examiner* — Bao-Luan Le
(74) *Attorney, Agent, or Firm* — Birch, Stewart, Kolasch & Birch, LLP

(57) ABSTRACT

A reflector mounting structure includes a reflector and a fixing member. The reflector includes: a reflecting surface; a reflector body having the reflecting surface formed thereon; a pair of first connecting units provided respectively at an end face of the reflector body and having a substantially spherical first protrusion at an end thereof; and a second connecting unit provided at an end face of the reflector body. The fixing member which supports the reflector includes a pair of first supporting units respectively having a planar contact portion and bringing the contact portion into contact with an end of the first protrusion, and a second supporting unit.

A contact-portion vertical distance is set such that the first protrusion moves while rolling with respect to a contact portion when the reflector deforms.

11 Claims, 9 Drawing Sheets

REFLECTOR MOUNTING STRUCTURE AND PROJECTION DISPLAY DEVICE

BACKGROUND OF THE INVENTION

1. Field of the Invention

The present invention relates to a reflector mounting structure used for a projection display device or the like and a projection display device using the reflector mounting structure.

2. Description of the Related Art

A mirror (reflector) having a reflecting surface is mounted on a projection display device such as a projector. However, to project an image without distortion, the mirror needs to be mounted with a high position accuracy. Conventionally, therefore, the mirror is fixed on a fixing member provided in the projection display device by a number of screws. However, when the mirror expands or contracts due to a change in temperature or humidity, a stress is accumulated in the mirror, originating at screwed parts. The shape of the reflecting surface of the mirror is then deformed due to the stress, and as a result, there is a problem that distortion is generated on an image projected on a screen.

To solve this problem, for example, Japanese Patent No. 3913265 (paragraphs 0017 to 0020, FIGS. 1 and 5) discloses the following reflector holding mechanism. That is, in this conventional reflector holding mechanism, a first lug is provided below a mirror, and second lugs are respectively provided at two positions on the right and left sides of an upper part of the mirror. The first lug is supported by a pivot supporting unit provided in a fixing member and the second lug is supported by a pair of right and left slide supporting units provided in the fixing member, thereby holding the mirror by the fixing member. With this structure, even when temperature and humidity change, positions of the second lugs provided at two positions on the right and left move, and the mirror expands or contract as a result. Accordingly, deformation of the mirror is alleviated and distortion of an image is also alleviated.

However, in the conventional reflector holding mechanism described above, when the shape of the mirror changes due to a change in temperature or humidity, or due to an impact applied at the time of transport, the following problem is caused. That is, when the temperature or humidity returns to its original state, or when the mirror tries to be its original shape immediately after the impact, the mirror does not slide smoothly or even if it slides in the slide supporting unit, it is hard to return to its original position due to a friction between the second lugs provided on the sides of the mirror and the fixing member. Therefore, there is a problem that deformation of the mirror is not recovered and image distortion occurs as a result.

SUMMARY OF THE INVENTION

It is an object of the present invention to at least partially solve the problems in the conventional technology. A reflector mounting structure including a reflector that includes: a reflecting surface; a reflector body having the reflecting surface formed thereon; a pair of first connecting units provided respectively at an end face of the reflector body and having a substantially spherical first protrusion at an end thereof; and a second connecting unit provided at an end face of the reflector body, installed at a position where the pair of first connecting units are symmetrical to each other, and having a substantially spherical second protrusion at an end thereof; and a fixing member that has a pair of first supporting units respectively having a planar contact portion and bringing the contact portion into contact with an end of the first protrusion, and a second supporting unit having a receiving surface for rotatably supporting the second protrusion, and supports the reflector by the first and second supporting units, wherein a contact-portion vertical distance, which is a distance in a direction vertical to the contact portion, from a connecting part between the first connecting unit and the reflector body to a center of curvature of the first protrusion provided at an end of the first connecting unit, is set such that the first protrusion moves while rolling with respect to the contact portion when the reflector deforms.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a reflector mounting structure and a projection display device according to the present invention will be explained below in detail with reference to the accompanying drawings. The present invention is not limited to the embodiments.

Figure 1:
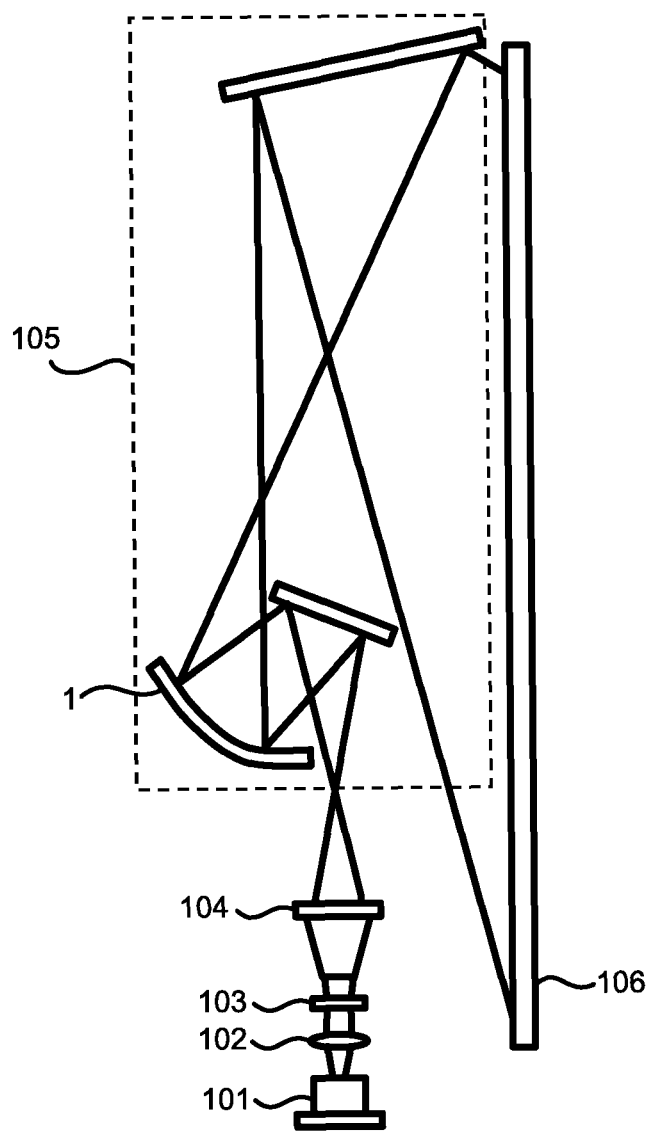
FIG. 1 is a side view for explaining constituent elements of a projection display device according to an embodiment of the present invention.

FIG. 1 is a side view for explaining constituent elements of a projection display device according to an embodiment of the present invention. As illustrated in FIG. 1, light emitted from a light source 101 passes through a lens 102, is provided with image information by an image display element 103, and then projected on a screen 106 as an image through a projection lens 104 and an optical-path-setting mirror group 105. The optical-path-setting mirror group 105 includes, for example, an aspherical mirror 1, which is a reflector. The mounting accuracy of the aspherical mirror 1 included in the optical-path-setting mirror group 105 is important with respect to correcting image distortion.

Figure 2A:
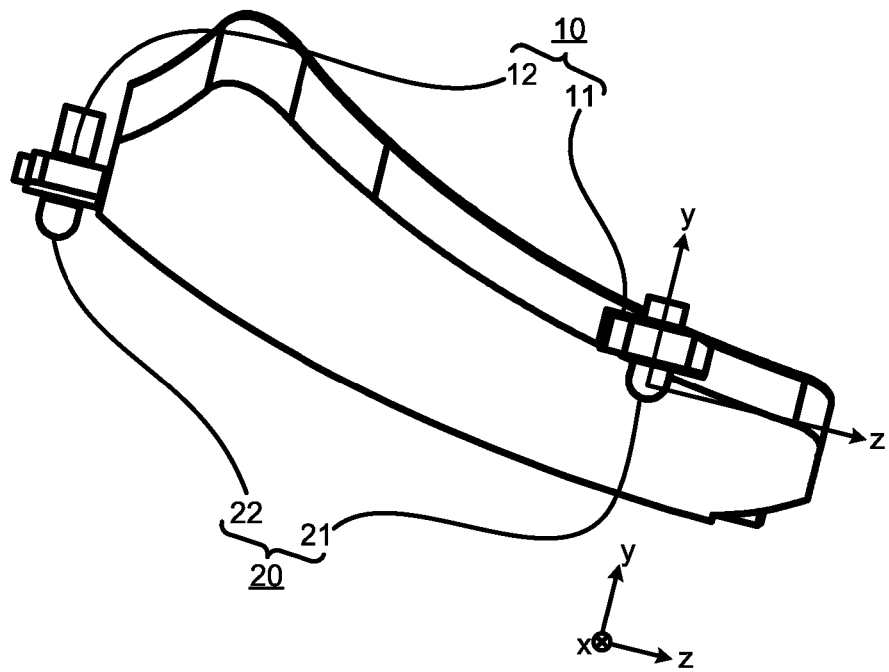
FIGS. 2A and 2B are outline views of a mirror according to the embodiment.
Figure 2B:
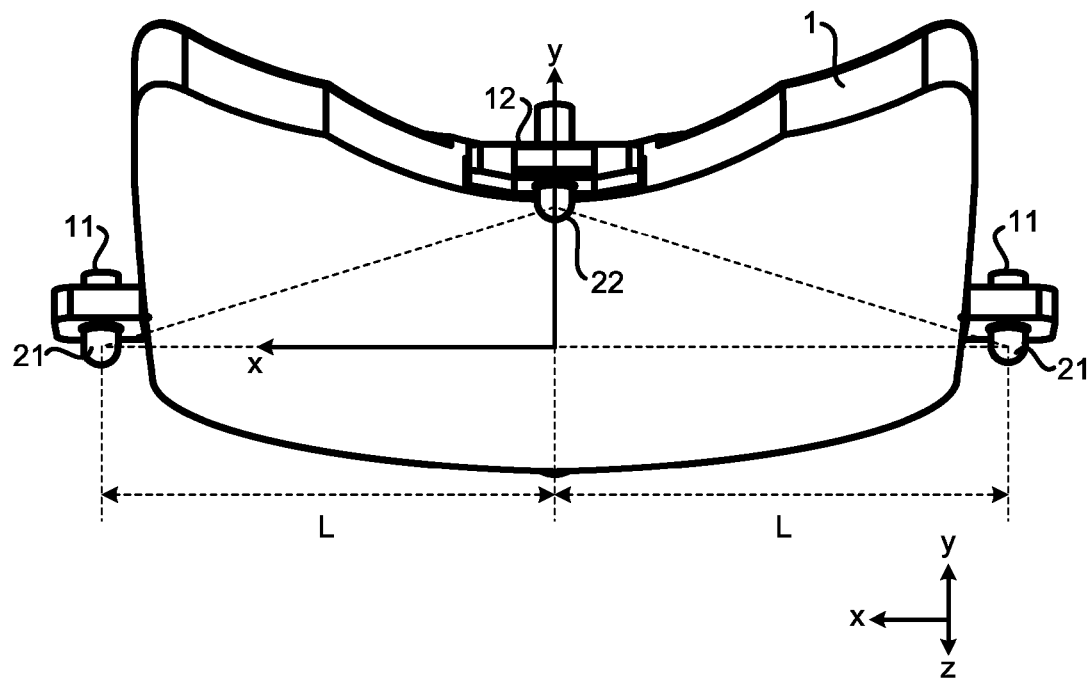

FIGS. 2A and 2B are outline views of the aspherical mirror 1, where FIG. 2A is a side view and FIG. 2B is a back view of the aspherical mirror 1. As illustrated in FIGS. 2A and 2B, the aspherical mirror 1 includes three connecting units 10 at end faces thereof, and a protrusion 20 with an end thereof being substantially spherical is provided therein, respectively. The connecting unit 10 includes two first connecting units 11 and one second connecting unit 12. Hereinafter, the protrusion provided in the first connecting unit 11 is referred to as a first protrusion 21, and the protrusion provided in the second connecting unit 12 is referred to as a second protrusion 22. The aspherical mirror 1 is, for example, an integral part including the connecting unit 10 and the protrusion 20.

As illustrated in FIGS. 2A and 2B for the following explanations, an x-axis is defined as a straight line that passes through respective centers of the two substantially spherical first protrusions 21, a y-axis orthogonal to the x-axis in an xy-plane is defined, which is a plane including the x-axis and for determining a radius of curvature of a reflecting surface 1a (illustrated in FIG. 3), and a z-axis vertical to the x-axis and the y-axis is defined. The plane for determining the radius of curvature of the reflecting surface 1a is a plane on which a radius of curvature of a circular arc approximating a line of intersection with the reflecting surface 1a in a plane including the x-axis according to a least-square method becomes largest. The line of intersection may be approximated by a method other than the least-square method. When the reflecting surface is spherical, the plane becomes a plane that passes through a center of a sphere, that is, a line of intersection forms a large circle. It is assumed here that the y-axis is vertical to a plane that passes through respective centers of three substantially spherical protrusions 20.

The aspherical mirror 1 has a symmetrical shape with respect to a yz-plane that passes through the center thereof, and the second protrusion 22 is provided in a direction parallel to the y-axis on the yz-plane that passes through the center of the aspherical mirror 1. The respective centers of the two first protrusions 21 are respectively positioned at an equal distance (a distance L) from the yz-plane that passes through the center of the aspherical mirror 1 (FIG. 2B).

Figure 3:
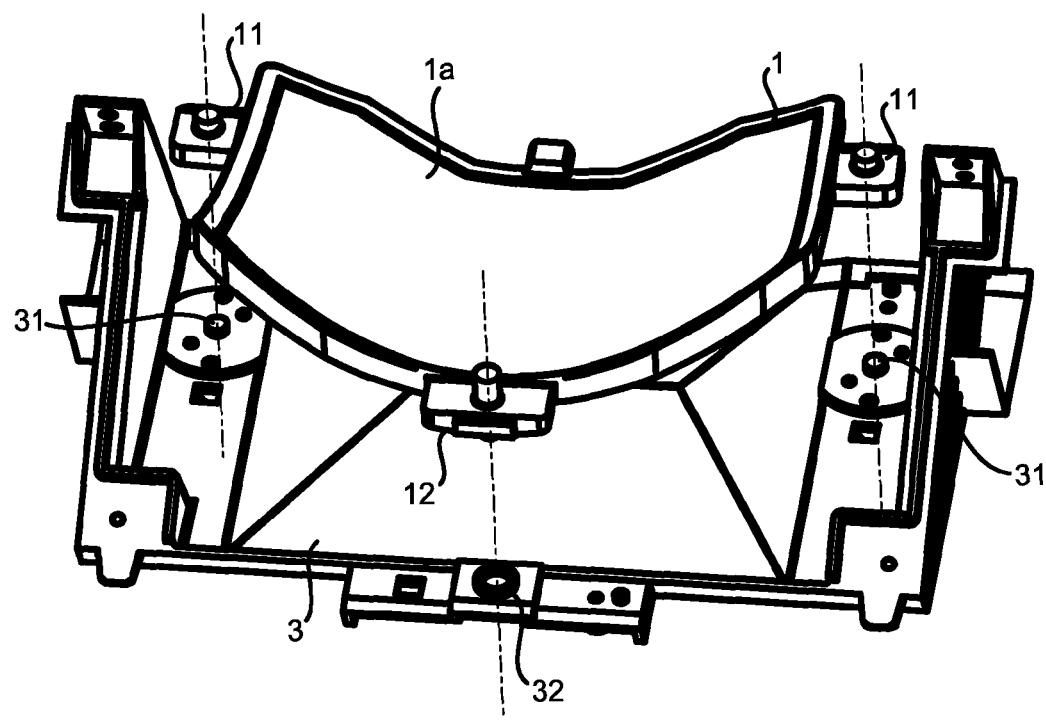
FIG. 3 is a perspective view of an outline of a mirror mounting structure according to the embodiment.

FIG. 3 is a perspective view of an outline of a mirror mounting structure. A fixing member 3 includes two first supporting units 31 and a second supporting unit 32. The two first supporting units 31 respectively come in contact with the two first protrusions 21 provided to the aspherical mirror 1, the second supporting unit 32 comes in contact with the second protrusion 22 provided to the aspherical mirror 1, so that the fixing member 3 supports the aspherical mirror 1. The aspherical mirror 1 includes the reflecting surface 1a that reflects irradiation light.

Figure 4:
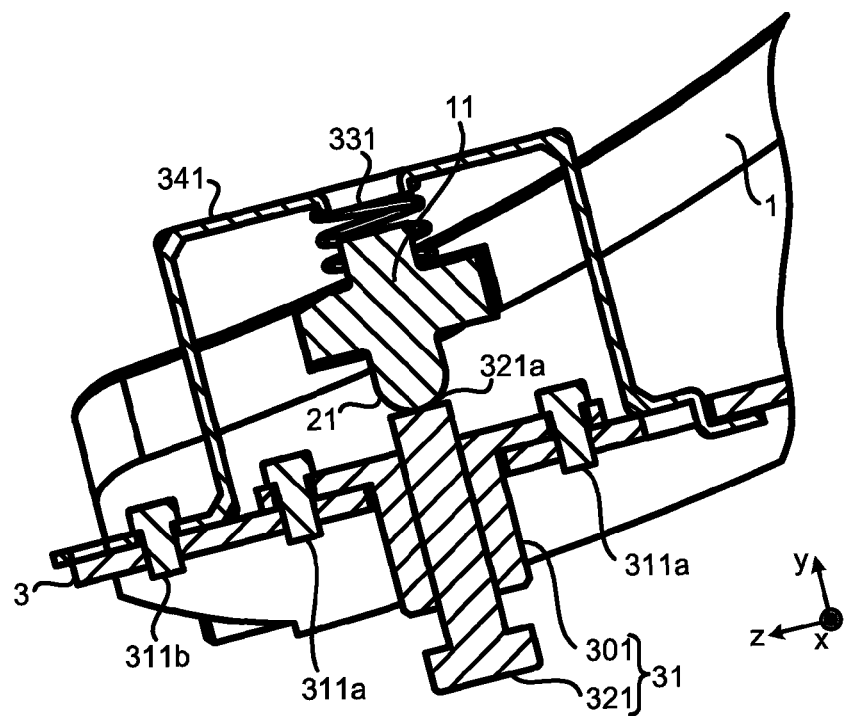
FIG. 4 is a sectional view of the mirror mounting structure according to the embodiment.

A structure of the first supporting unit 31 is explained next. FIG. 4 is a sectional view of the first connecting unit 11 and the first supporting unit 31. The first supporting unit 31 includes a bush 301 and an adjusting screw 321, and the bush 301 is fixed to the fixing member 3 by a screw 311a. A screw hole with which the adjusting screw 321 is screwed together is provided at the center of the bush 301. A planar contact portion 321a is provided at an end of the adjusting screw 321. The first connecting unit 11 is pressed to the first supporting unit 31 in a state being pressed toward the fixing member 3 by a spring 331, by fixing a retainer plate 341 to the fixing member 3 by a screw 311b. The aspherical mirror 1 is fitted to the fixing member 3 so that the contact portion 321a provided at the end of the adjusting screw 321 comes in contact with the first protrusion 21 provided in the first connecting unit 11. The first protrusion 21 may be in a shape having a part of a substantial sphere at the end (that is, a substantially spherical shape), and is, for example, a substantially hemispherical shape (that is, a substantially semicircular shape in cross section) in the example illustrated in the drawings.

With the above arrangement, the aspherical mirror 1 is fitted to the fixing member 3 so that the substantially spherical first protrusion 21 at the end of the first connecting unit 11 comes in contact in a minute area with the planar contact portion 321a provided in the first supporting unit 31. The first protrusion 21 may adjust the position thereof (a distance between the fixing member 3 and the first protrusion 21) by rotating the adjusting screw 321. The contact portion 321a is vertical to the y-axis.

Figure 5:
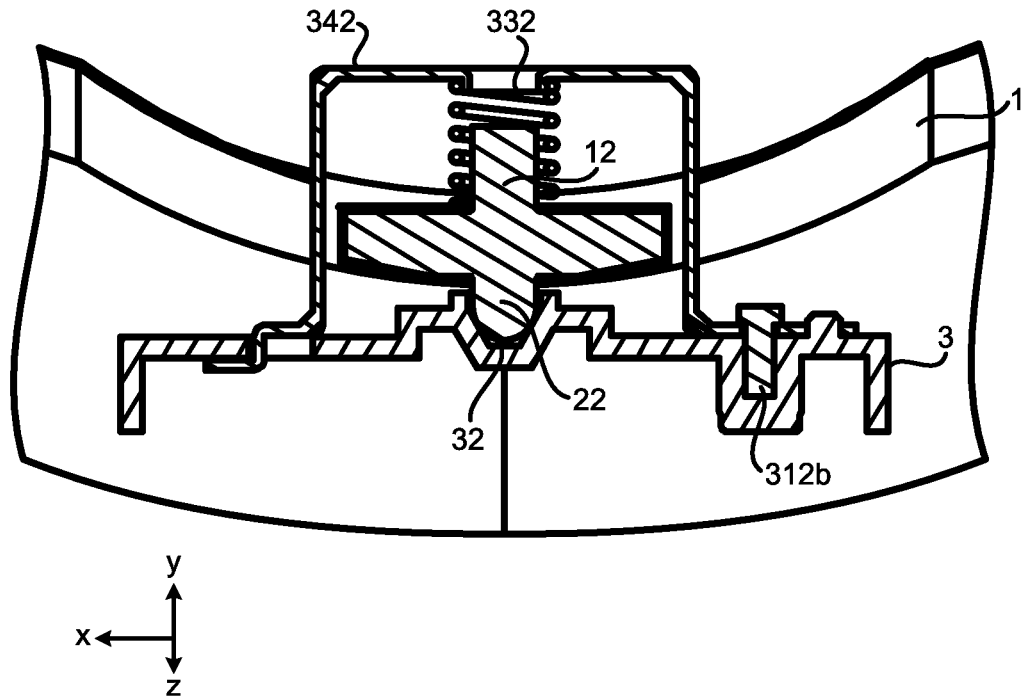
FIG. 5 is another sectional view of the mirror mounting structure according to the embodiment.

The second supporting unit 32 is explained next with reference to FIG. 5. The second supporting unit 32 has a mortar-shaped receiving surface, and the aspherical mirror 1 is arranged in a manner such that the second protrusion 22 comes in contact with the second supporting unit 32. The second supporting unit 32 rotatably supports the second protrusion by the mortar-shaped receiving surface. As in the first connecting unit 11, the second connecting unit 12 is pressed to the second supporting unit 32 in a state being pressed toward the fixing member 3 by a spring 332, by fixing a retainer plate 342 to the fixing member 3 by a screw 312b, and the second protrusion 22 at the end of the second connecting unit 12 is pressed to the second supporting unit 32. The structure functions as a pivot support.

Figure 6:
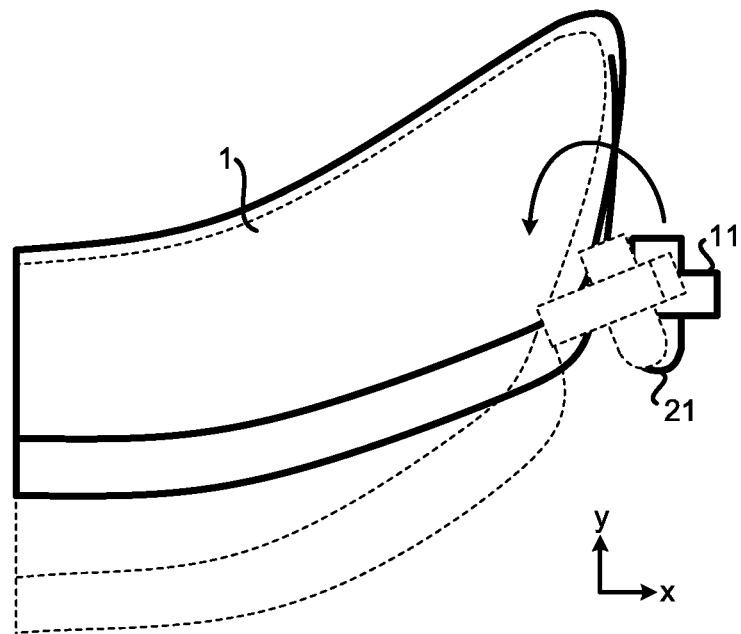
FIG. 6 depicts a deformation simulation result of a mirror in the mirror mounting structure according to the embodiment.

In the above explained configuration of the first protrusion 21 and the first supporting unit 31, a mechanism in which image distortion hardly occurs, for example, when an impact at the time of transport is applied thereto is explained next. FIG. 6 depicts a result of simulating a deformation when a load of impact is applied to the aspherical mirror 1 in a downward perpendicular direction, and a solid line indicates a state before deformation, and a dotted line indicates a state after deformation. The first connecting unit 11 also moves with a large deformation of the aspherical mirror 1; however, the position of the first protrusion 21 at the end of the first connecting unit 11 hardly moves. It can be understood that because the first protrusion 21 has a substantially spherical shape and comes in contact with the planar contact portion 321a at the end of the adjusting screw 321 provided in the first supporting unit 31, the end of the first protrusion 21 moves in such a manner to roll on the contact portion 321a with the deformation of the aspherical mirror 1. In FIG. 6, a rolling direction is indicated by an arrow. Thus, when the first protrusion 21 rolls on the contact portion 321a without sliding, a friction generated between the first protrusion 21 and the contact portion 321a becomes minimal, and the support structure of the first protrusion 21 by the first supporting unit 31 does not pose an impediment to smooth deformation of the aspherical mirror 1.

Generally, regarding a friction generated between members, when a magnitude of a sliding friction generated when a member moves on the other member in a sliding manner and a magnitude of a rolling friction generated when a spherical member moves on a plane in a rolling manner are compared with each other, the rolling friction is considerably smaller than the sliding friction. Accordingly, if the first protrusion 21 has a configuration capable of rolling on the plane of the contact portion 321a, the friction generated between the first protrusion 21 and the contact portion 321a becomes the rolling friction. In such a configuration, therefore, the friction becomes minimal, and the first protrusion 21 rolls again after an external force or the like applied to the aspherical mirror 1 is eliminated, thereby the first protrusion 21 may easily return to a standard design position.

A condition or the like of the first protrusion 21 to move on the plane of the contact portion 321a in a rolling manner are explained below in detail.

Figure 7A:
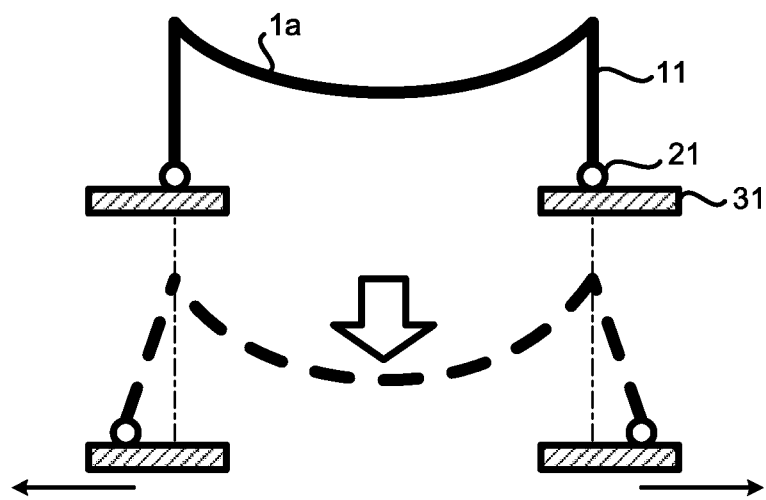
FIGS. 7A and 7B are conceptual diagrams of deformation of a mirror in the mirror mounting structure according to the embodiment.
Figure 7B:
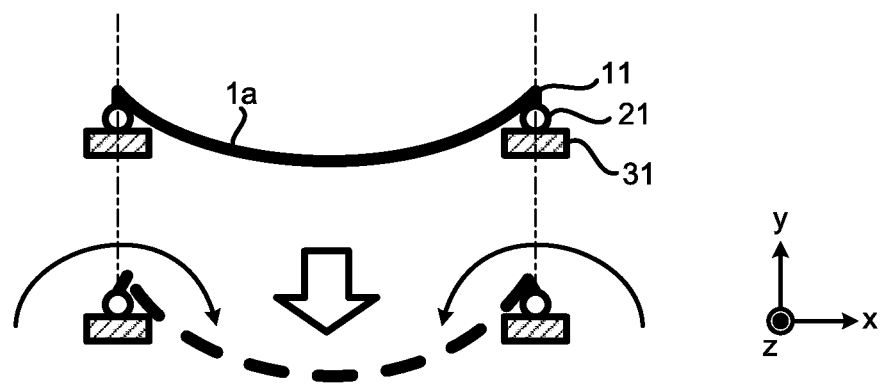
Figure 8:
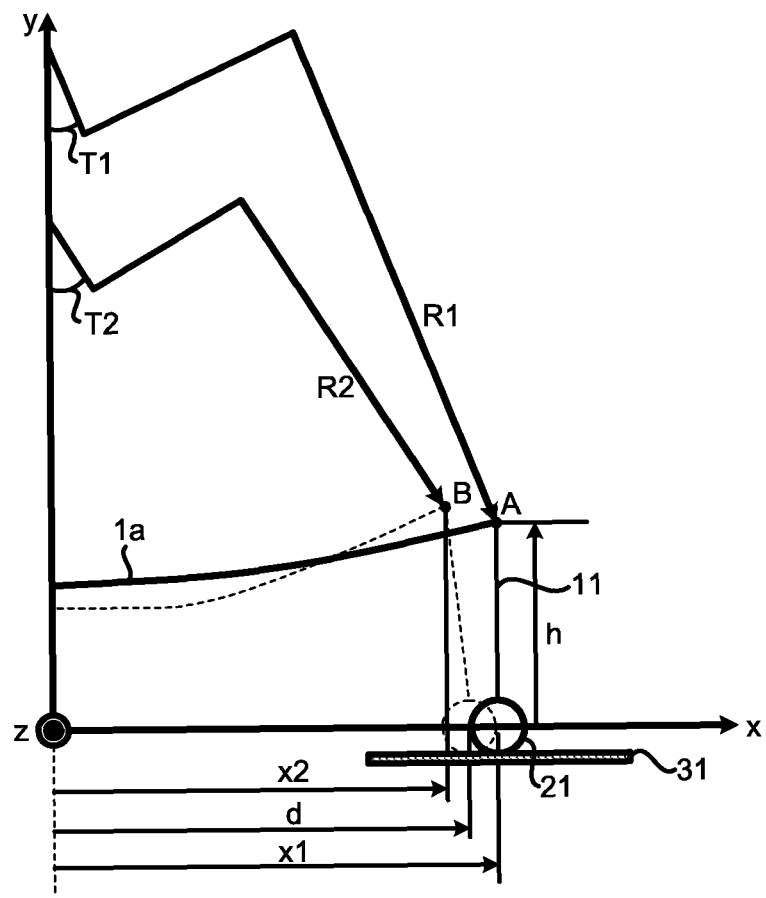
FIG. 8 depicts respective parameters of the mirror mounting structure according to the embodiment.

A concept of the first protrusion 21 moving while rolling is explained first with reference to FIGS. 7A, 7B and 8. FIG. 7A is a conceptual diagram when the aspherical mirror 1 including the concave reflecting surface 1a is supported by increasing a height of the first connecting unit 11 so that the first protrusion 21 does not roll, and FIG. 7B is a conceptual diagram when the aspherical mirror 1 is supported by decreasing the height of the first connecting unit 11 so that the first protrusion 21 moves while rolling. A normal state is indicated by a solid line, and a state where the aspherical mirror 1 deforms due to an impact load in a −y (minus y)-axis direction is indicated by a dotted line. In a case of FIG. 7A, when an impact load is applied, the aspherical mirror 1 deforms so that the radius of curvature of the concave surface decreases, and the two first protrusions 21 respectively move on the first supporting unit 31 in a direction to leave away from each other in an x-axis direction. Because the first connecting unit 11 inclines toward a center of the reflecting surface 1a, the two first protrusions 21 need to move in a direction approaching each other in the x-axis direction so that the first protrusion 21 may roll. However, in the case of FIG. 7A, because the first protrusions 21 are largely separated from each other in a lateral direction, the first protrusions 21 may not move by rolling, but may move by sliding. On the other hand, in a case of FIG. 7B in which the height of the first connecting unit 11 is sufficiently low, when the impact load is applied, the aspherical mirror 1 deforms so that the radius of curvature of the concave face decreases, and the two first protrusions 21 respectively try to move in a direction approaching each other in the x-axis direction. This direction coincides with a moving direction by rolling, and the positions of the first protrusions 21 are substantially the same as the length of rolling of the end thereof, and thus the first protrusions 21 move mainly by rolling.

FIG. 8 is a schematic diagram for geometrically explaining a relation between the mounting structure and the first protrusion 21 according to the present embodiment in detail, regarding a condition of a structure in which the first protrusion 21 rolls in the x-axis direction. In FIG. 8, a positive range of the x-axis in the xy-plane is illustrated, designating a line that passes through the center of curvature of a substantially spherical shape of the two first protrusions 21 as the x-axis, and a line that passes through the center of curvature of the reflecting surface 1a and orthogonal to the x-axis as the y-axis. That is, the x-axis is defined, with a difference by the radius of curvature r of the first protrusion 21 with respect to the position of the contact portion 321a in the y-axis direction in the first supporting unit 31. A z-axis is vertical to the xy-plane. In FIG. 8, the reflecting surface 1a illustrated by a solid curved line is, for example, a concave surface having a spherical shape, and the radius of curvature thereof is designated as R1.

As illustrated in FIG. 8, the first connecting unit 11 parallel to the y-axis direction and having a height h is arranged at the end of the reflecting surface 1a, and the first protrusion 21 provided at the end of the first connecting unit 11 is arranged. The height h is a height in the y-axis direction from a connecting part between the first connecting unit 11 and a reflector body to the center of curvature of the first protrusion 21 (to be strict, a direction included in the xy-plane and vertical to the contact portion 321a). An angle formed by the y-axis and a line connecting an intersection (a connecting point) A, which is the intersection of the first connecting unit 11 and the reflecting surface 1a, with the center of curvature of the reflecting surface 1a is assumed as T1. In this case, x- and y-coordinates at the connecting point A of the first connecting unit 11 and the reflecting surface 1a, and at the center of the first protrusion 21 become, respectively, (x1, h) and (x1, 0), and x1 is indicated by the following equation (1). It is assumed that h>0 on an opposite side of the reflecting surface 1a with respect to the y-axis direction (that is, a backside of the reflecting surface 1a), and h<0 on the side of the reflecting surface 1a with respect to the y-axis direction (that is, a front side of the reflecting surface 1a). FIG. 8 depicts a case of h>0. In the case of h<0, the first connecting unit 11 is extended upward, and the center of curvature of the first protrusion 21 is also positioned at a higher position than the connecting point A.

$$x1 = R1 \times \sin(T1) \quad (1)$$

In FIG. 8, the reflecting surface 1a in such a state that the aspherical mirror 1 deforms instantly when an impact is applied to the aspherical mirror 1 in a downward perpendicular direction (the minus y-axis direction), and the radius of curvature becomes R2 is illustrated by a dotted line. In this state, an angle formed by the y-axis and a line connecting an intersection (a connecting point) B, which is the intersection of the first connecting unit 11 and the reflecting surface 1a, with the center of curvature of the reflecting surface 1a is assumed as T2. In this case, when the x-coordinate at the connecting point B of the first connecting unit 11 and the reflecting surface 1a, and at the center of curvature of the first protrusion 21 are, respectively, x2 and d, x2 is geometrically expressed by the following equation (2), and d is geometrically expressed by the following equation (3). However, it is assumed that the first connecting unit 11 and the first protrusion 21 have a higher rigidity than that of the aspherical mirror 1 and do not deform.

$$x2 = R2 \times \sin(T2) \quad (2)$$

$$d = x2 + h \times \sin(T2 - T) \quad (3)$$

Further, when it is assumed that the radius of curvature R2 after deformation changes to e times with respect to the radius of curvature R1 before deformation, and a length of the line of intersection of the reflecting surface 1a and the xy-plane does not change, the following equations (4) and (5) are established.

$$R2 = e \times R1 \quad (4)$$

$$R1 \times T1 = R2 \times T2 \quad (5)$$

Figure 9:
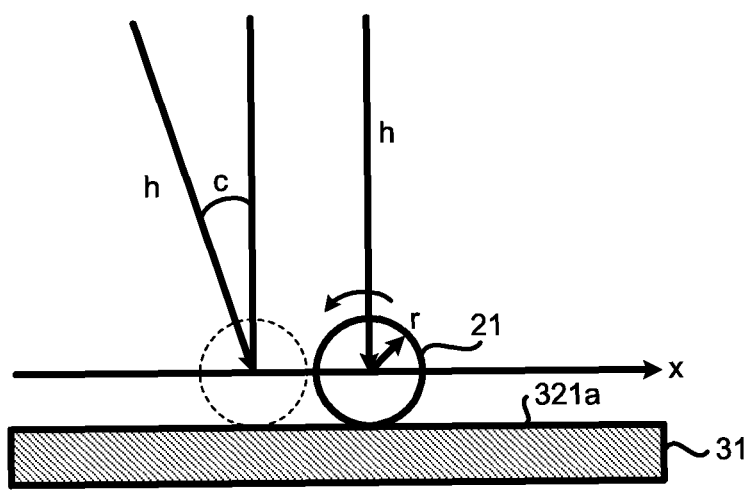
FIG. 9 depicts rolling of a protrusion in the mirror mounting structure according to the embodiment.

FIG. 9 depicts a state where the first protrusion 21 is rolling. For the first protrusion 21 to roll, x1≧d needs to be satisfied. The equations (1) to (5) are transformed to obtain the following equation (6) as a condition of h for satisfying x1≧d.

$$h \le \frac{R1 \times (e \times \sin(T1/e) - \sin T1)}{\sin(T1 - T1/e)} \quad (6)$$

Figure 10:
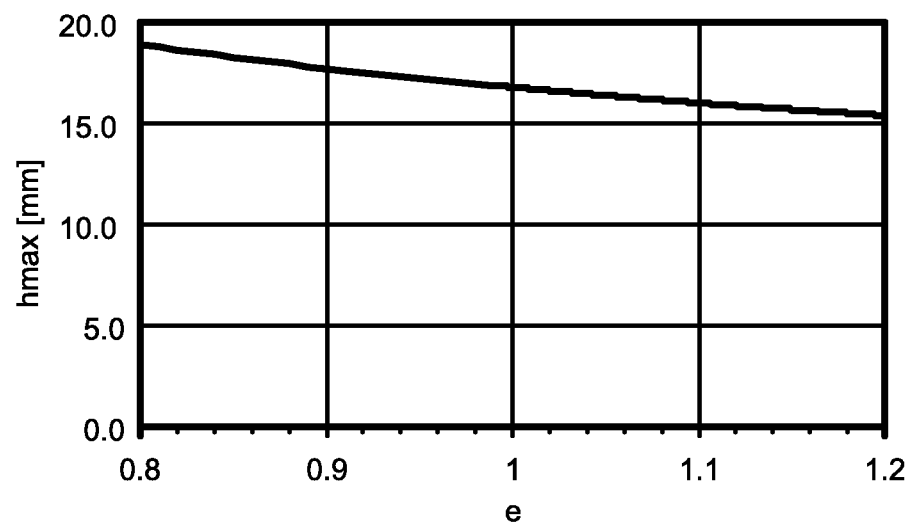
FIG. 10 is a graph of an example of a relation between a height h of a first connecting unit and a ratio e of a change in a radius of curvature such that a first protrusion in the mirror mounting structure according to the embodiment does not move.

In the equation (6), it is assumed that h is hmax when an equal sign is established. FIG. 10 is a graph of hmax in a range of a deformation ratio e being 0.8 to 1.2, when R1=200 mm (millimeters), x1=100 mm, and T1=0.524 (radian). As e increases, hmax decreases. When the reflecting surface is a concave surface, even if R1 and T1 are different, hmax decreases as e increases.

The deformation ratio e, which is a value obtained by dividing the radius of curvature R2 of the reflecting surface 1*a* after deformation by the radius of curvature before deformation, depends on a magnitude of the impact load. Therefore, it is assumed that a range in which a deformation of the aspherical mirror 1 is predicted is eH (>1) on a side where the radius of curvature of the reflecting surface 1*a* increases, and is eL (<1) on a side where the radius of curvature decreases. That is, a following range is taken into consideration as the deformation ratio e. In a normal usage environment, it is expected that almost all of the deformation of the radius of curvature is about 10% or less. Therefore, for example, eH=1.1 and eL=0.9 may be set. In the flowing inequation (7), the range of the deformation ratio e to be predicted is appropriately determined, taking into consideration rigidity or the like of the aspherical mirror 1.

$$eL < e(=R2/R1) < eH \quad (7)$$

For the first protrusion 21 to roll against all of the predicted deformations, the equation (6) needs to be established in all the ranges of the deformation ratio e to be predicted, and thus the following equation (8) needs to be established.

$$h \le \frac{R1 \times (eH \times \sin(T1/eH) - \sin T1)}{\sin(T1 - T1/eH)} \quad (8)$$

The first protrusion 21 has a substantially spherical shape and a radius of curvature r. It is assumed that a rolling angle is c when the first protrusion 21 moves on the contact portion 321*a* only by rolling. Because c is a change of angle T for determining a numerical aperture of the reflecting surface 1*a*, a condition of the first protrusion 21 to move in the x-axis direction only by rolling with respect to the height h satisfying the equation (8) is expressed by the following equations (9) and (10).

$$x1 - d = r \times c \quad (9)$$

$$c = T2 - T1 \quad (10)$$

The following equation (11) is for obtaining the radius of curvature r along which the first protrusion 21 moves only by rolling.

$$r = \frac{(R1 \times (\sin T1 - e \times \sin(T1/e)) + h \times \sin(T1 - T1/e))}{T1/e - T1} \quad (11)$$

The equation (11) provides a condition in which the first protrusion 21 that supports the aspherical mirror 1 rolls without sliding, even if the aspherical mirror 1 deforms with a change ratio e of radius of curvature, as a relation between the radius of curvature r of the first protrusion 21 and the height h of the first connecting unit 11, when there is a desired shape of the aspherical mirror 1, that is, the radius of curvature R1 thereof and T1 for determining the numerical aperture are present.

A configuration in which the height h of the first connecting unit 11 satisfies the equation (8) and the radius of curvature r of the first protrusion 21 is positive has a following advantage, because the end of the first protrusion 21 tries to roll. That is, in the mounting structure according to the present embodiment, when an impact load is applied, because a rolling friction is sufficiently smaller than a sliding friction generated between the first protrusion 21 and the contact portion 321*a*, the first protrusion 21 moves while rolling and the aspherical mirror 1 deforms. However, after the load is eliminated, the first protrusion 21 can return to a design location while rolling again, because elasticity of the aspherical mirror 1 can overcome the magnitude of a rolling friction force, which is sufficiently smaller than the sliding friction. Accordingly, the reflecting surface 1*a* easily returns to a predetermined shape immediately after an impact or the like is applied at the time of transport, thereby distortion of an image is restrained from occurring.

Figure 11:
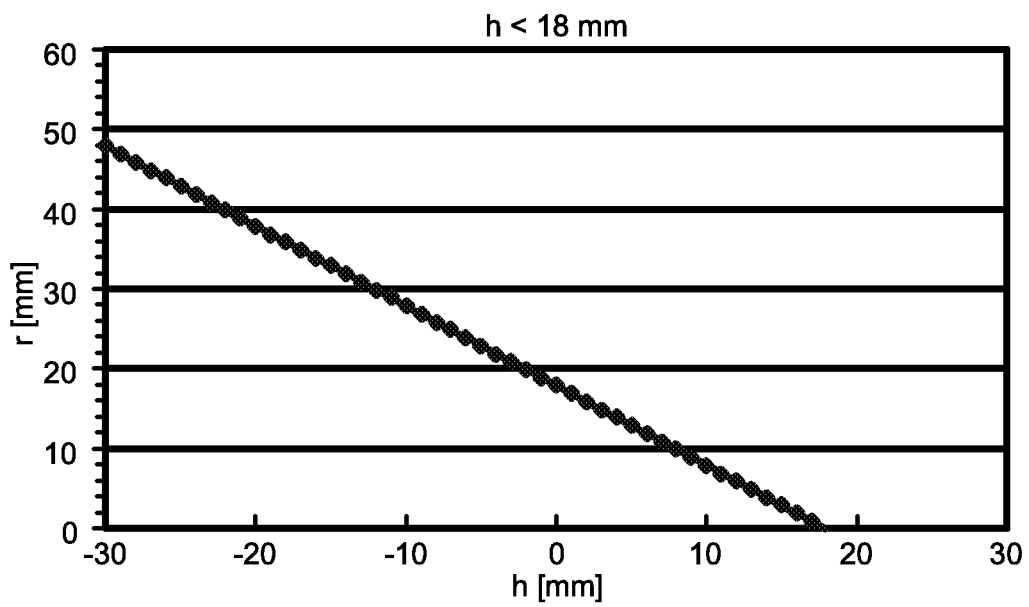
FIG. 11 is a graph of an example of a relation between the height h of the first connecting unit and a radius of curvature r of the first protrusion in the mirror mounting structure according to the embodiment.

A configuration in which the first protrusion 21 rolls more easily than the configuration expressed by the equation (8) is explained next. FIG. 11 depicts a relation between the radius of curvature r along which the first protrusion 21 moves only by rolling and the height h of the first connecting unit 11, in which r calculated according to the equation (11) is plotted on a y-axis, and h is plotted on the x-axis. For example, such a condition that R1=200 mm, x1=100 mm, and e=0.99 is selected. It is a condition in which the radius of curvature r takes a positive value, that is, a condition that the first protrusion 21 rolls without sliding is h<18 mm, as can be understood from the plotted result. When the value of h is negative, it means that the center of the first protrusion 21 having a substantially spherical shape is present on the side opposite to a convex side of the concave reflecting surface 1*a*.

Figure 12:
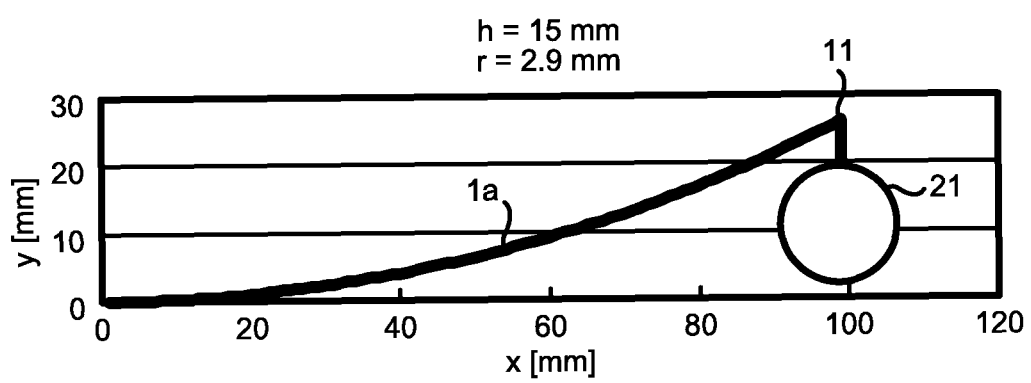
FIG. 12 is a graph of an example of a position relation among the first protrusion, the first connecting unit, and a reflecting surface in the mirror mounting structure according to the embodiment.

For example, a positional relation among the first protrusion 21, the first connecting unit 11, and the reflecting surface 1*a* when h=15 mm is illustrated in FIG. 12. In this case, as can be understood from FIG. 11, the radius of curvature r along which the first protrusion 21 moves only by rolling is r=2.9 mm. In this configuration, in the deformation with e=0.99, the first protrusion 21 can roll without sliding at all. Thus, in the case of a combination of the radius of curvature r of the first protrusion 21 and the height h of the first connecting unit 11 as illustrated in FIG. 11 in a range satisfying h<18 mm, the first protrusion 21 can roll somewhere in a deformation range to be predicted. However, because a restriction for the first protrusion 21 not to interfere the reflecting surface 1*a* spatially, a restriction for the first protrusion 21 to maintain a contact with the contact portion 321*a*, and a manufacturing restriction are present, actually, the combination of r and h is limited to realistic combinations. The size of the contact portion 321*a* is set larger than a shift amount of the first protrusion 21, so that the contact portion 321*a* and the first protrusion 21 come in contact with each other even if a shifting direction is deviated from the x-axis.

Figure 13:
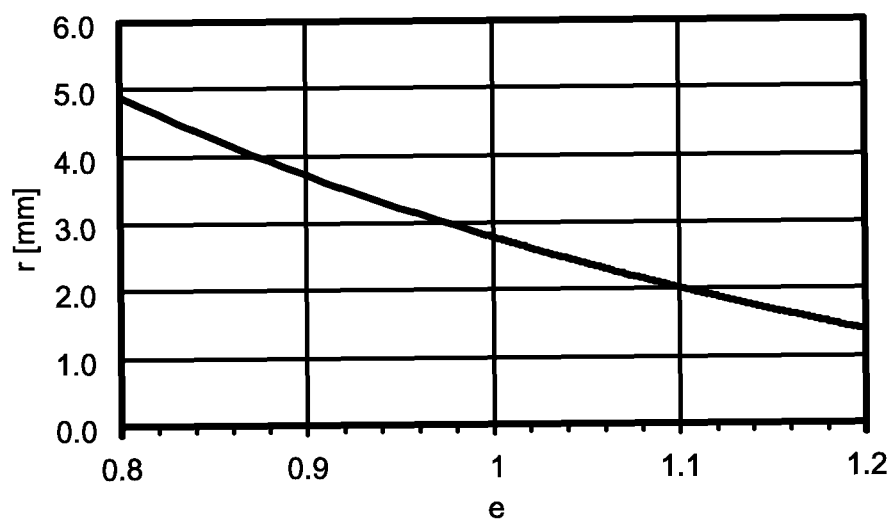
FIG. 13 is a graph of an example of a relation between the radius of curvature r of the first protrusion and the ratio e of the change in the radius of curvature of the reflecting surface in the mirror mounting structure according to the embodiment.

FIG. 13 is a graph in which a value of the deformation ratio e is plotted on the x-axis, and a value of the radius of curvature r along which the first protrusion 21 moves only by rolling is plotted on the y-axis when h=15 mm. As in hmax illustrated in FIG. 10, r decreases as e increases. When the reflecting surface is a concave surface, the same thing applies even if R1 and T1 are different. In a range of e shown in the inequation (7), the value of r changes in a range of from about 2.0 to 3.7 millimeters. That is, when the magnitude of the impact load changes, the first protrusion 21 cannot always move only by rolling. In the range of e shown in the equation (7), an index f mentioned below is used with regard to rollability, in order to examine a condition of the radius of curvature r so that the first protrusion 21 rolls as easily as possible.

When a left side member (x1−d) in the equation (9) is assumed as l, l indicates a distance that the first protrusion 21 needs to move. When a right side member (r×c) in the equation (9) is assumed as k, k indicates a distance that the first protrusion 21 can move by rolling. A distance that the first protrusion 21 moves in a sliding manner is assumed as s=l−k. If s>0, the first protrusion 21 cannot move the distance, which the first protrusion 21 should move, only by rolling, and thus the first protrusion 21 slides in a shifting direction. If s<0, because the shift amount of the first protrusion 21 by rolling is too large, the first protrusion 21 slides in an opposite direction. The index f of rollability is defined as in the equation (12).

$$f=|s|/|k| \quad (12)$$

As the index f of rollability decreases, it means that a distance to move in a sliding manner is smaller than a distance to move by rolling, and the first protrusion 21 may roll easily.

Figure 14:
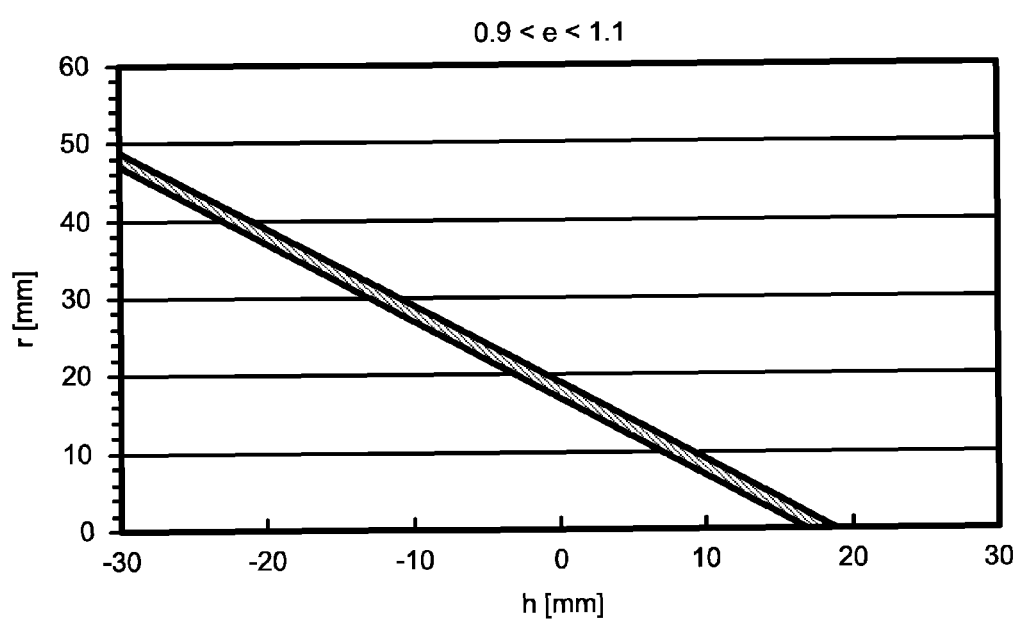
FIG. 14 is a graph of another example of a relation between the height h of the first connecting unit and the radius of curvature r of the first protrusion in the mirror mounting structure according to the embodiment.

It is to examine here as to reducing an average value of f in the range of e in the inequation (7), which is a range of determining deformation to be predicted. If the radius of curvature r is one that the first protrusion 21 can move only by rolling somewhere in a predicted range of e with respect to the height h satisfying the equation (8), the average value of f in the predicted range of e decreases more than a case of the radius of curvature r along which the first protrusion 21 cannot move only by rolling in the predicted range of e. Such a range of the radius of curvature r is obtained by the following inequation (13). A range of r satisfying a relation in the inequation (13) is shown by a shaded area in FIG. 14.

$$\frac{(R1 \times (eH \times \sin(T1/eH) - \sin T1) - h \times \sin(T1 - T1/eH))}{T - T/eH} < \quad (13)$$

$$r < \frac{(R1 \times (\sin T1 - eL \times \sin(T1/eL)) - h \times \sin(T1/eL - T))}{T1/eL - T}$$

Further, when r is determined such that the index f of rollability becomes the same between an upper limit eH and a lower limit eL of e, the average value of f in the range of e in the inequation (7) becomes minimum. The r is obtained by the following equation (14).

$$r = \left(\frac{(R1 \times (eH \times \sin(T1/eH) - \sin T1) - h \times \sin(T1 - T1/eH))}{T - T/eH} + \frac{(R1 \times (\sin T1 - eL \times \sin(T1/eL)) - h \times \sin(T1/eL - T))}{T1/eL - T1}\right)/2 \quad (14)$$

Even when the first connecting unit 11 is not parallel to the y-axis direction and the first protrusion 21 has a distance g in the x-axis direction from the connecting point between the first connecting unit 11 and the reflecting surface 1*a* in a state before deformation, the equations (8), (11), and (14), and the inequation (13) may be used without change. When the first connecting unit 11 has the distance g in the x-axis direction, strictly, d, which is a position of the connecting point B after deformation in FIG. 8, should be expressed as the following equation (3A).

$$d=x2+h\times\sin(T2-T1)+g\times(\cos(T2-T1)-1) \quad (3A)$$

In the equation (3A), R1=200 mm, x1=100 mm, and T1=0.524 (radian), and in a range of 0.9(=eL)<e<1.1(=eH), it may be considered that |T2−T1|<0.058 (radian), and cos(T2−T1)=1.

A case that the contact portion 321*a* is not parallel to the x-axis is examined here. An angle formed by the x-axis and a line of intersection between the xy-plane and the contact portion 321*a* is designated as δ. The two regions of contact portion 321*a* are symmetrical to each other with respect to a yz-plane. To be strict, when one contact portion 321*a* forms an angle of δ with the x-axis, the other contact portion 321*a* forms an angle of −δ with the x-axis. Because a shifting distance on the line of intersection not between the x-axis and the xy-plane but between the contact portion 321*a* and the xy-plane should be examined, the equations (8), (11), and (14), and the inequation (13) are changed as mentioned below. The height h is changed to a contact-portion vertical distance h, which is a distance in a direction vertical to the contact portion 321*a*, from a connecting part between the first connecting unit 11 and the aspherical mirror 1 (corresponding to the connecting point A in FIG. 8) to the center of curvature of the first protrusion 21 provided at the end of the first connecting unit 11. In this case, h takes positive and negative values, and when h>0, the center of curvature of the first protrusion 21 is on a side closer to the contact portion 321*a* than the connecting point A, and when h<0, the center of curvature is on a farther side.

A condition to be satisfied by the contact-portion vertical distance h of the contact portion for the first protrusion 21 to roll with respect to all of predicted deformations is expressed by the following inequation (15).

$$h \leq \frac{R1 \times \cos\delta \times (eH \times \sin(T1/eH) - \sin T1)}{\sin(T1 - T1/eH)} \quad (15)$$

The following equation (16) is an equation for obtaining a radius of curvature r along which the first protrusion 21 moves only by rolling with respect to the contact-portion vertical distance h satisfying the inequation (15).

$$r = \frac{(R1 \times \cos\delta \times (\sin T1 - e \times \sin(T1/e)) + h \times \sin(T1 - T1/e))}{T1/e - T1} \quad (16)$$

A range of the radius of curvature r along which the first protrusion 21 moves only by rolling somewhere in a predicted range of e expressed by the equation (7) is expressed by the following inequation (17).

$$\frac{(R1 \times \cos\delta \times (eH \times \sin(T1/eH) - \sin T1) - h \times \sin(T1 - T1/eH))}{T - T/eH} < \quad (17)$$

$$r < \frac{(R1 \times \cos\delta \times (\sin T1 - eL \times \sin(T1/eL)) - h \times \sin(T1/eL - T))}{T1/eL - T}$$

A radius of curvature r having the smallest average value of f in the predicted range of e is expressed by the following equation (18).

$$r = \left( \frac{(R1 \times \cos\delta \times (eH \times \sin(T1/eH) - \sin T1) - h \times \sin(T1 - T1/eH))}{(T - T/eH)} + \frac{(R1 \times \cos\delta \times (\sin T1 - eL \times \sin(T1/eL)) - h \times \sin(T1/eL - T1))}{T1/eL - T1} \right) / 2 \quad (18)$$

In the configuration described above, in which the first protrusion 21 can roll, when an impact load is applied, the first protrusion 21 rolls, and when the impact load is not applied, the elasticity of the aspherical mirror 1 overcomes the magnitude of the rolling friction force, which is sufficiently smaller than the sliding friction, and thus the first protrusion 21 can roll again and return to the predetermined design location. Accordingly, before and after an impact or the like is applied at the time of transport, the reflecting surface 1a easily returns to a predetermined shape, thereby enabling to suppress an occurrence of distortion of an image.

A case that the reflecting surface 1a is a convex surface is examined below. When the reflecting surface 1a is a convex surface, a direction in which the first connecting unit 11 inclines due to deformation of the aspherical mirror 1 becomes opposite to a case that the reflecting surface 1a is a concave surface. When a radius of curvature R1 of the reflecting surface 1a increases, the first connecting unit 11 inclines toward the center of the reflecting surface 1a, and when the radius of curvature R1 decreases, the first connecting unit 11 inclines outward of the reflecting surface 1a. Accordingly, although detailed explanations thereof are omitted, the contact-portion vertical distance h needs to be negative for the first protrusion 21 to roll. The value of hmax, which is h with which the first protrusion 21 does not move, also takes a negative value, and an absolute value thereof decreases as the deformation ratio e increases. Therefore, when the reflecting surface 1a is a convex surface, in order that the first protrusion 21 can roll with respect to all of the predicted deformations, the contact-portion vertical distance h needs to be a distance that the first protrusion 21 can roll with the lower limit eL of the deformation ratio e.

When the reflecting surface 1a is a convex surface, the contact-portion vertical distance h and the radius of curvature r of the first protrusion 21, with which the first protrusion 21 rolls with respect to all of the predicted deformations, need to satisfy the following inequation (19).

$$h \le \frac{R \times \cos\delta \times (\sin T - eL \times \sin(T/eL))}{\sin(T - T/eL)} < 0 \quad (19)$$

$$r \ge |h|$$

The condition of $r \ge |h|$ expresses that it is difficult to provide the first protrusion 21 largely away from the connecting part of the first connecting unit 11 in the reflector body toward the opposite side of the contact portion 321a, as a manufacturing restriction. Further, when the radius of curvature r increases, the index f of rollability decreases. Therefore, it is preferable to make the radius of curvature r as small as possible.

A case that the reflecting surface 1a is a planar surface is examined below. As in the case of the reflecting surface 1a being a convex surface, the contact-portion vertical distance h and the radius of curvature r of the first protrusion 21, with which the first protrusion 21 rolls with respect to all of the predicted deformations, are determined based on such a condition that the reflecting surface rolls with a largest deformation which makes the reflecting surface a convex surface. The reflecting surface 1a having a length x1 in the x-axis direction before deformation has a radius of curvature RL due to the predicted largest deformation which makes the reflecting surface 1a a convex surface, and an angle formed by the y-axis and a line, which connects a connecting part of the first connecting unit 11 in the aspherical mirror 1 with the center of curvature of the reflecting surface 1a, is designated as TL (=x1/RL). When the reflecting surface 1a is a planar surface, the contact-portion vertical distance h and the radius of curvature r of the first protrusion 21, with which the first protrusion 21 rolls with respect to all of the predicted deformations, need to satisfy the following inequation (20). In the inequation (20), because x1=RL×TL, x1 is deleted. It is preferable to make the radius of curvature r as small as possible, as in the case of the reflecting surface 1a being a convex surface.

$$h \le -\frac{RL \times \cos\delta \times (TL - \sin TL)}{\sin TL} < 0 \quad (20)$$

$$r \ge |h|$$

In the above explanations, a deformation when an impact is applied to the aspherical mirror 1 is explained. However, the present embodiment can be applied generally to a case that the radius of curvature of the aspherical mirror 1 temporarily changes due to a disturbance. That is, it is obvious that the present embodiment is applicable to, for example, a case that the aspherical mirror 1 deforms due to a change in temperature or humidity and the radius of curvature of the reflecting surface 1a also changes.

The reflector mounting structure according to the present invention can suppress distortion of a reflector, because a friction between the first protrusion and the contact portion is suppressed and the shape of the reflector easily returns to its original shape.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A reflector mounting structure comprising:
 a reflector including:
  a reflecting surface;
  a reflector body having the reflecting surface formed thereon;
  a pair of first connecting units provided respectively at an end face of the reflector body and having a substantially spherical first protrusion at an end thereof; and
  a second connecting unit provided at an end face of the reflector body, installed at a position where the pair of first connecting units are symmetrical to each other, and having a substantially spherical second protrusion at an end thereof; and
 a fixing member that has a pair of first supporting units respectively having a planar contact portion and bringing the contact portion into contact with an end of the first protrusion, and a second supporting unit having a receiving surface for rotatably supporting the second protrusion, and supports the reflector by the first and second supporting units, wherein a contact-portion vertical distance, which is a distance in a direction vertical to the contact portion, from a connecting part between the first connecting unit and the reflector body to a center of curvature of the first protrusion provided at an end of the first connecting unit, is set such that the first protrusion moves while rolling with respect to the contact portion when the reflector deforms,
wherein
assuming that an axis that passes through respective centers of curvature of the pair of first protrusions is designated as an x-axis,
assuming that a plane including the x-axis in which a radius of a circular arc approximating a line of intersection between the plane and the reflecting surface becomes largest is designated as an xy-plane, and an axis included in the xy-plane and orthogonal to the x-axis is designated as a y-axis, and
assuming that the radius of the circular arc approximating a line of intersection between the xy-plane and the reflecting surface is designated as a radius of curvature of the reflecting surface, and a center of the circular arc is designated as a center of curvature of the reflecting surface,
the contact-portion vertical distance is set such that the center of curvature of the first protrusion moves toward a side to which the connecting part moves in a plane parallel to the contact portion, assuming that when the reflector deforms, the radius of curvature of the reflecting surface changes, and a connecting angle at the connecting part between the first connecting unit and the reflector body does not change,
the reflecting surface is a concave surface, and
assuming that a radius of curvature of the reflecting surface is designated as R, an angle formed by the y-axis and a line connecting a connecting part between the first connecting unit and the reflector body with the center of curvature of the reflecting surface is designated as T, an angle formed by the x-axis and a line of intersection between the xy-plane and the contact portion is designated as δ, and a contact-portion vertical distance is designated as h, and
assuming that the R becomes e times in largest deformation predicted for the reflector,
the contact-portion vertical distance h is set to satisfy a condition expressed by the following inequation:

$$h \leq \frac{R \times \cos\delta \times (e \times \sin(T/e) - \sin T)}{\sin(T - T/e)}.$$

2. The reflector mounting structure according to claim 1, wherein the contact-portion vertical distance and a size of the contact portion are set such that the first protrusion moves while rolling with respect to the contact portion when the reflector deforms in a predicted range.

3. The reflector mounting structure according to claim 1, wherein
when the radius of curvature of the first protrusion is designated as r, assuming that the R becomes eL times on a side where the R decreases in largest deformation predicted for the reflector, and assuming that the R becomes eH times on a side where the R increases in largest deformation predicted for the reflector,
the radius of curvature r of the first protrusion is set to satisfy following inequations:

$$\frac{(R \times \cos\delta \times (eH \times \sin(T/eH) - \sin T) - h \times \sin(T - T/eH))}{T - T/eH} <$$
$$r < \frac{(R \times \cos\delta \times (\sin T - eL \times \sin(T/eL)) - h \times \sin(T/eL - T))}{T/eL - T}.$$

4. A projection display device comprising the reflector mounting structure according to claim 1.

5. The reflector mounting structure according to claim 3, wherein the radius of curvature r of the first protrusion is set to satisfy following equation:

$$r = \left( \frac{(R \times \cos\delta \times (eH \times \sin(T/eH) - \sin T) - h \times \sin(T - T/eH))}{T - T/eH} + \frac{(R \times \cos\delta \times (\sin T - eL \times \sin(T/eL)) - h \times \sin(T/eL - T))}{T/eL - T} \right) \Big/ 2.$$

6. A projection display device comprising the reflector mounting structure according to claim 3.

7. A projection display device comprising the reflector mounting structure according to claim 5.

8. A reflector mounting structure comprising:
a reflector including:
a reflecting surface;
a reflector body having the reflecting surface formed thereon;
a pair of first connecting units provided respectively at an end face of the reflector body and having a substantially spherical first protrusion at an end thereof; and
a second connecting unit provided at an end face of the reflector body, installed at a position where the pair of first connecting units are symmetrical to each other, and having a substantially spherical second protrusion at an end thereof; and
a fixing member that has a pair of first supporting units respectively having a planar contact portion and bringing the contact portion into contact with an end of the first protrusion, and a second supporting unit having a receiving surface for rotatably supporting the second protrusion, and supports the reflector by the first and second supporting units, wherein
a contact-portion vertical distance, which is a distance in a direction vertical to the contact portion, from a connecting part between the first connecting unit and the reflector body to a center of curvature of the first protrusion provided at an end of the first connecting unit, is set such that the first protrusion moves while rolling with respect to the contact portion when the reflector deforms,
wherein
assuming that an axis that passes through respective centers of curvature of the pair of first protrusions is designated as an x-axis,
assuming that a plane including the x-axis in which a radius of a circular arc approximating a line of intersection between the plane and the reflecting surface becomes largest is designated as an xy-plane, and an axis included in the xy-plane and orthogonal to the x-axis is designated as a y-axis, and
assuming that the radius of the circular arc approximating a line of intersection between the xy-plane and the reflecting surface is designated as a radius of curvature of the reflecting surface, and a center of the circular arc is designated as a center of curvature of the reflecting surface, the contact-portion vertical distance is set such that the center of curvature of the first protrusion moves toward a side to which the connecting part moves in a plane parallel to the contact portion, assuming that when the reflector deforms, the radius of curvature of the reflecting surface changes, and a connecting angle at the connecting part between the first connecting unit and the reflector body does not change, the reflecting surface is a convex surface, and assuming that a radius of curvature of the reflecting surface is designated as R, an angle formed by the y-axis and a line connecting a connecting part between the first connecting unit and the reflector body with the center of curvature of the reflecting surface is designated as T, an angle formed by the x-axis and a line of intersection between the xy-plane and the contact portion is designated as δ, and a contact-portion vertical distance is designated as h, and assuming that the R becomes e times in largest deformation predicted for the reflector, the contact-portion vertical distance h and the radius of curvature r of the first protrusion are set to satisfy a condition expressed by following inequations:

$$h \leq \frac{R \times \cos\delta \times (\sin T - e \times \sin(T/e))}{\sin(T - T/e)} < 0$$

$$r \geq |h|.$$

9. A projection display device comprising the reflector mounting structure according to claim 8.

10. A reflector mounting structure comprising:
a reflector including:
   a reflecting surface;
   a reflector body having the reflecting surface formed thereon;
   a pair of first connecting units provided respectively at an end face of the reflector body and having a substantially spherical first protrusion at an end thereof; and
   a second connecting unit provided at an end face of the reflector body, installed at a position where the pair of first connecting units are symmetrical to each other, and having a substantially spherical second protrusion at an end thereof; and
a fixing member that has a pair of first supporting units respectively having a planar contact portion and bringing the contact portion into contact with an end of the first protrusion, and a second supporting unit having a receiving surface for rotatably supporting the second protrusion, and supports the reflector by the first and second supporting units, wherein
a contact-portion vertical distance, which is a distance in a direction vertical to the contact portion, from a connecting part between the first connecting unit and the reflector body to a center of curvature of the first protrusion provided at an end of the first connecting unit, is set such that the first protrusion moves while rolling with respect to the contact portion when the reflector deforms,
wherein
   assuming that an axis that passes through respective centers of curvature of the pair of first protrusions is designated as an x-axis,
   assuming that a plane including the x-axis in which a radius of a circular arc approximating a line of intersection between the plane and the reflecting surface becomes largest is designated as an xy-plane, and an axis included in the xy-plane and orthogonal to the x-axis is designated as a y-axis, and
   assuming that the radius of the circular arc approximating a line of intersection between the xy-plane and the reflecting surface is designated as a radius of curvature of the reflecting surface, and a center of the circular arc is designated as a center of curvature of the reflecting surface,
   the contact-portion vertical distance is set such that the center of curvature of the first protrusion moves toward a side to which the connecting part moves in a plane parallel to the contact portion, assuming that when the reflector deforms, the radius of curvature of the reflecting surface changes, and a connecting angle at the connecting part between the first connecting unit and the reflector body does not change,
   the reflecting surface is a planar surface, and
   assuming that an angle formed by the x-axis and a line of intersection between the xy-plane and the contact portion is designated as δ, and
   assuming that a radius of curvature in largest deformation predicted for the reflector is R, and an angle formed by the y-axis and a line connecting a connecting part between the first connecting unit and the reflector body with the center of curvature of the reflecting surface is T,
the contact-portion vertical distance h and the radius of curvature r of the first protrusion are set to satisfy a condition expressed by following inequations:

$$h \leq -\frac{R \times \cos\delta \times (T - \sin T)}{\sin T} < 0$$

$$r \geq |h|.$$

11. A projection display device comprising the reflector mounting structure according to claim 10.

* * * * *